(12) United States Patent
Xiong et al.

(10) Patent No.: US 9,369,050 B1
(45) Date of Patent: Jun. 14, 2016

(54) INDIRECT CURRENT SENSING METHOD FOR A CONSTANT CURRENT FLYBACK CONVERTER

(71) Applicant: Universal Lighting Technologies, Inc., Madison, AL (US)

(72) Inventors: Wei Xiong, Madison, AL (US); Travis L. Berry, Madison, AL (US); Keith Davis, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 14/606,480

(22) Filed: Jan. 27, 2015

Related U.S. Application Data

(60) Provisional application No. 61/981,903, filed on Apr. 21, 2014.

(51) Int. Cl.
*H05B 37/02* (2006.01)
*H02M 3/335* (2006.01)
*H05B 33/08* (2006.01)

(52) U.S. Cl.
CPC ....... *H02M 3/33523* (2013.01); *H05B 33/0815* (2013.01); *H05B 33/0845* (2013.01)

(58) Field of Classification Search
CPC .......... H02M 3/33523; H05B 33/0815; H05B 33/0845
See application file for complete search history.

(56) References Cited

U.S. PATENT DOCUMENTS

| 5,138,543 | A | * | 8/1992 | Harm | ................ | H02M 3/33507 363/21.04 |
| 6,944,034 | B1 | * | 9/2005 | Shteynberg | ......... | H02M 1/4258 323/282 |
| 2007/0064358 | A1 | | 3/2007 | Murata et al. | | |
| 2007/0159856 | A1 | * | 7/2007 | Yang | ....................... | H02M 1/44 363/21.12 |
| 2009/0058323 | A1 | | 3/2009 | Yang | | |

(Continued)

*Primary Examiner* — Jason M Crawford
(74) *Attorney, Agent, or Firm* — Patterson Intellectual Property Law, P.C.; Mark J. Patterson; Gary L. Montle

(57) ABSTRACT

An LED driver circuit includes circuitry for indirect sensing of an isolated output current. A rectifier circuit produces DC power to a power factor correction circuit including a switch and a primary transformer winding. An LED array is coupled to a secondary winding of the transformer. An auxiliary transformer winding is coupled to a feedback circuit which generates a feedback signal that is representative of the output current without receiving any direct feedback from the secondary side of the transformer. A capacitor may be coupled across the auxiliary winding, which charges and discharges energy as the switch is driven on and off. A controller further drives the switch based on comparison of an average voltage across the capacitor with respect to a reference value corresponding to desired output current through the load. The reference value may be provided to the controller from an external dimming control circuit.

13 Claims, 3 Drawing Sheets

(56) References Cited

U.S. PATENT DOCUMENTS

| | | | | |
|---|---|---|---|---|
| 2010/0142232 A1* | 6/2010 | Lin | ............... | H02M 3/33523 363/21.16 |
| 2010/0201335 A1* | 8/2010 | Li | ............... | H02M 3/33507 323/284 |
| 2010/0295470 A1* | 11/2010 | Koutensky | ............... | H05B 33/0815 315/294 |
| 2010/0302822 A1* | 12/2010 | Wang | ............... | H02M 3/33523 363/126 |
| 2011/0157922 A1 | 6/2011 | Konecny et al. | | |
| 2011/0228570 A1* | 9/2011 | Li | ............... | H02M 3/156 363/21.13 |
| 2011/0255311 A1* | 10/2011 | Hsu | ............... | H02M 3/33507 363/21.15 |
| 2011/0266969 A1 | 11/2011 | Ludorf | | |
| 2012/0057375 A1 | 3/2012 | Yang et al. | | |
| 2012/0081039 A1 | 4/2012 | Yang et al. | | |
| 2012/0250366 A1* | 10/2012 | Wang | ............... | H02M 3/33523 363/21.15 |
| 2012/0287682 A1* | 11/2012 | Zhang | ............... | H02M 3/33507 363/21.16 |
| 2013/0093356 A1 | 4/2013 | Green et al. | | |
| 2013/0169162 A1 | 7/2013 | Simi | | |
| 2014/0167634 A1* | 6/2014 | Ivankovic | ............... | H05B 33/0851 315/210 |
| 2014/0301116 A1* | 10/2014 | Zhang | ............... | H02M 3/33515 363/21.15 |

* cited by examiner

INDIRECT CURRENT SENSING METHOD FOR A CONSTANT CURRENT FLYBACK CONVERTER

CROSS-REFERENCES TO RELATED APPLICATIONS

This application claims benefit of U.S. Provisional Patent Application No. 61/981,903, filed Apr. 21, 2014, and which is hereby in its entirety incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to flyback power converters. More particularly, the present invention relates to an LED driver having a power factor correction stage with indirect current sensing circuitry that implements a low-cost, dimmable, class II single-stage flyback topology.

Light emitting diode (LED) lighting is growing in popularity due to decreasing costs and long life compared to incandescent lighting and fluorescent lighting. LED lighting can also be dimmed without impairing the useful life of the LED light source. Typical requirements for LED drivers include protective isolation between an unregulated DC power source and the regulated DC output voltage to the load, a need for constant current control, and a high power factor (i.e., a ratio for the real power flowing to the load with respect to an apparent power, ideally approaching 100% or in other words a value between 0 and 1).

"Flyback" converters are widely considered to be an optimal solution for LED driver circuitry because they can easily provide power factor correction, inherently create isolation between the power factor correction and load stages, and are of relatively low cost. However, due to the class II isolation, it is also difficult to sense the output current through the load for providing output current regulation.

With reference to an exemplary power conversion circuit 10 as is conventionally known in the art, as shown in FIG. 1, T1 is a flyback transformer that helps create the class II isolation. The load Rload is on the secondary side 13 of the transformer and is coupled to one ground GND_S, while the control circuit 12 is coupled on the primary side 11 of the transformer with another ground GND_P. The controller 12 in this example is a power factor correction IC with current control capability. An input terminal Ctr receives the current feedback control signal. Another terminal GD is an output for providing driving signals to the MOSFET Q1 gate drive.

To properly control the output current, current information has to be passed from the secondary side to the primary side of the isolation transformer. As shown in FIG. 1, a current sensing resistor R_I_sense senses the load current and a first OPAMP circuit 14 amplifies the sensing signal, which is then fed back to a second OPAMP circuit 16 to provide, e.g., PI (proportional and integral) or P (proportional only) control operations. The control output in this example is fed to the source/diode side of an opto-isolator 18 to form a current signal. The sensor/emitter side of the opto-isolator 18 will transfer the current signal from the diode side and feed it back to the input terminal Ctr for current regulation.

One of skill in the art may appreciate that such examples of traditional current control are not only lossy (because of the power dissipation in the current sensor R_I_sense and the OPAMP circuits 14, 16), but also relatively costly in nature.

Therefore, it would be desirable to provide accurate indirect sensing of the primary current for at least the objectives of high efficiency and relatively low cost.

BRIEF SUMMARY OF THE INVENTION

In one embodiment, an LED driver circuit as disclosed herein includes circuitry for indirect sensing of an isolated output current. A rectifier circuit produces DC power to a power factor correction circuit including a switch and a primary transformer winding. An LED array is coupled to a secondary winding of the transformer. An auxiliary transformer winding is coupled to a feedback circuit which generates a feedback signal that is representative of the output current without receiving any direct feedback from the secondary side of the transformer.

In a particular example of the embodiment, a capacitor is coupled across the auxiliary winding, which charges and discharges energy as the switch is driven on and off. A controller further drives the switch based on comparison of an average voltage across the capacitor with respect to a reference value corresponding to desired output current through the load.

In an exemplary aspect, the reference value may be provided to the controller from an external dimming control circuit.

DETAILED DESCRIPTION OF THE INVENTION

Figure 1:
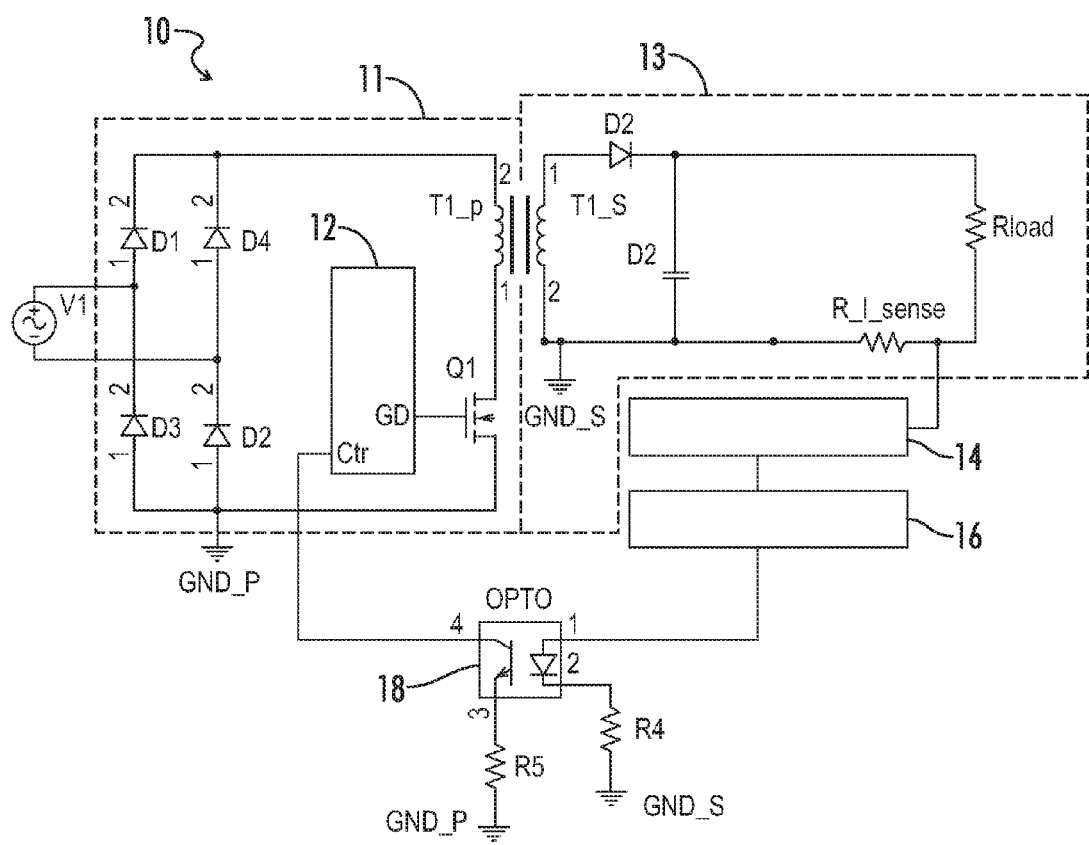
FIG. 1 is a circuit diagram representing an example of a power converter as conventionally known in the art.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Figure 2:
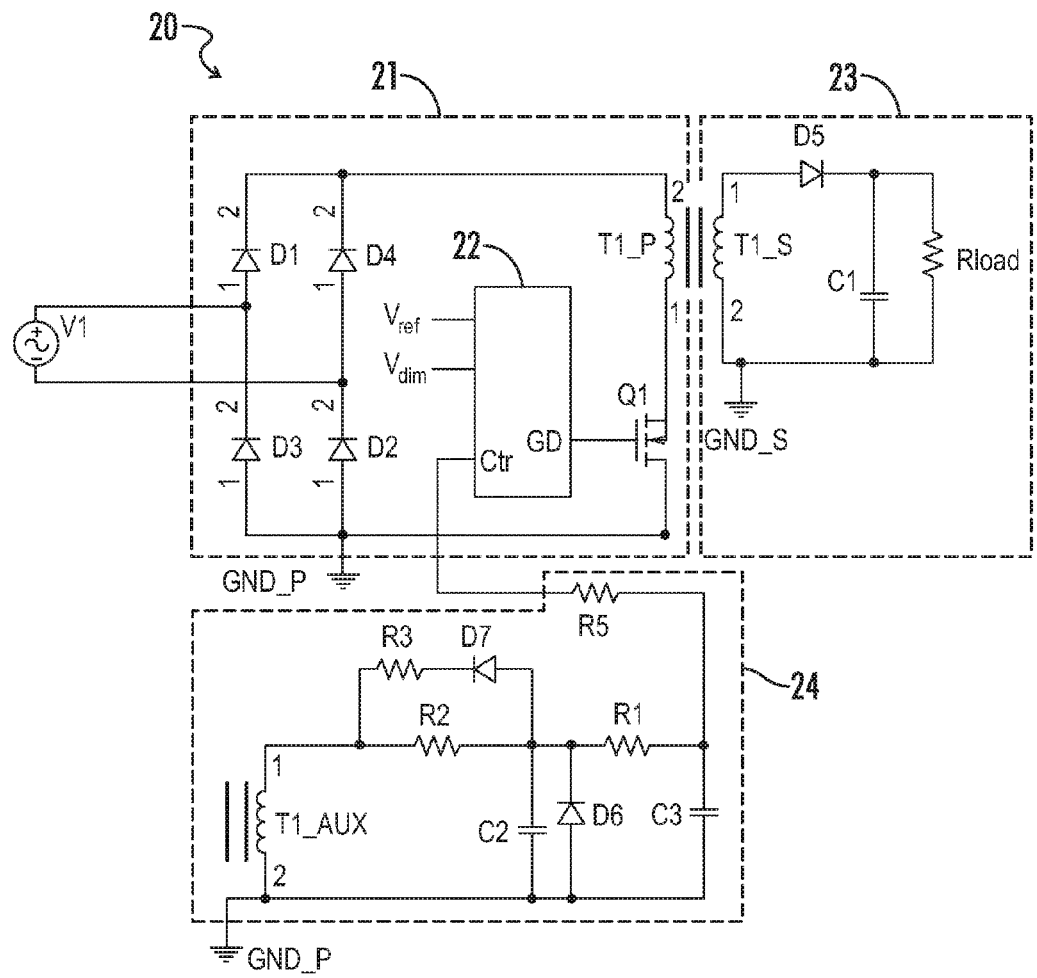
FIG. 2 is a circuit diagram representing an example of a power converter according to an embodiment of the present invention.
Figure 3:
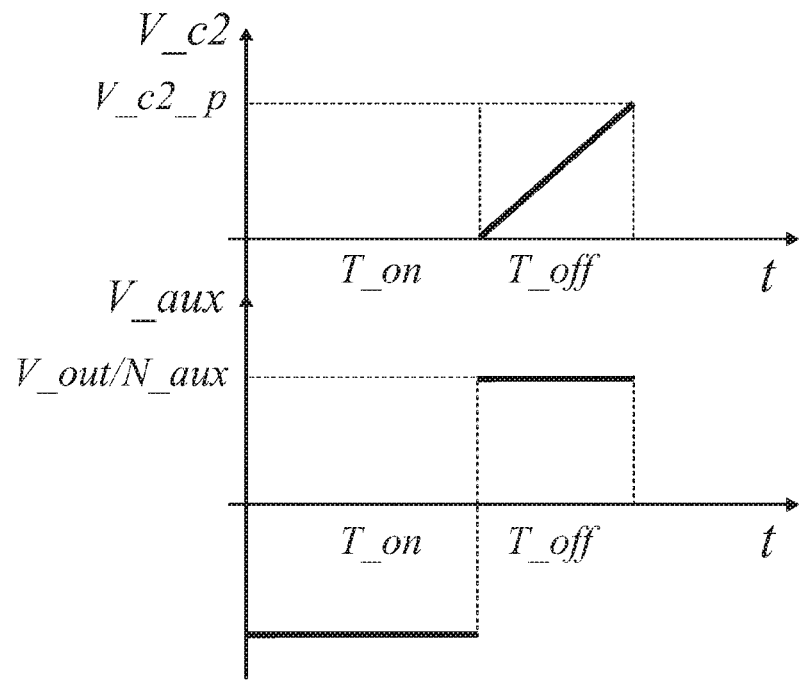
FIG. 3 is a graphical representation of an exemplary voltage waveform during a switching period across the feedback circuit capacitor C2 of the power converter of FIG. 2.
Figure 4:
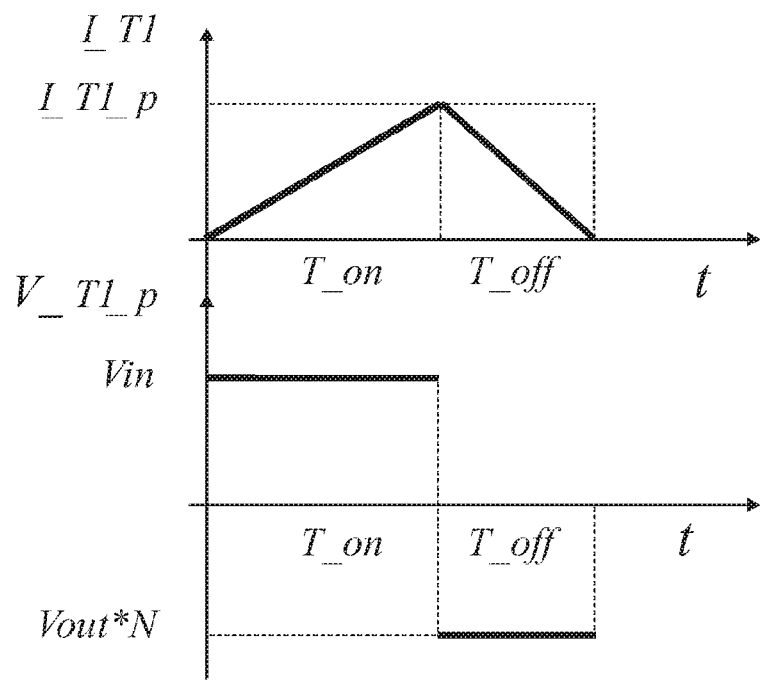
FIG. 4 is a graphical representation of exemplary current and voltage information during a switching period with respect to the primary winding for the power converter of FIG. 2.

Referring generally to FIGS. 2-4, exemplary embodiments of an LED driver may now be described including a flyback converter with indirect output current sensing circuitry and control methods. Where the various figures may describe embodiments sharing various common elements and features with other embodiments, similar elements and features are given the same reference numerals and redundant description thereof may be omitted below.

Referring first to FIG. 2, an embodiment of a power converter 20 as disclosed herein includes a DC source coupled to or otherwise integrated within an input circuit, or primary circuit 21. The DC source as shown may be a bridge rectifier circuit D1-D4 coupled to an AC input source V1, so as to convert AC power from the AC source V1 to a DC input. The primary circuit 21 further includes a switching element Q1 coupled in series with a primary winding $T1_p$ for a flyback transformer T1, and a power factor correction controller 22 with current control capability. The controller 22 may typically be similar in nature to that described above with respect to FIG. 1, in that it is configured to receive a control input and produce driving signals to the switching element Q1.

An output circuit, or secondary circuit 23, includes a load Rload coupled across a secondary winding $T1_s$ for the flyback transformer. In the example shown, the load $R_{load}$ is further coupled in parallel with a series circuit of a diode D5 and capacitor C1, but a current sensor as referenced above with respect to the prior art is not necessary.

An auxiliary circuit, or feedback circuit 24, includes an energy storage device coupled across an auxiliary winding $T1_{aux}$ for the flyback transformer. The energy storage device in various embodiments as further described herein is a capacitor C2. Output current information may be recreated by using the voltage from the auxiliary winding $T1_{aux}$ to charge capacitor C2.

The voltage waveform across the capacitor C2 during respective switching periods Ton and Toff is shown in FIG. 3. During an on-time Ton for the switching element Q1, a voltage across the auxiliary winding T1_aux is negative, as shown in FIG. 3. This negative voltage will discharge the capacitor C2 through a branch including diode D7 and resistor R3. The discharge will be extremely fast if the resistance R3 is arranged to be small. A clamping circuit may be applied to clamp the voltage of the capacitor C2 during Ton to around zero. In the embodiment shown, the clamping circuit may be a simple diode D6 coupled in parallel with the capacitor C2.

During the off-time Toff of the switching element Q1, the voltage Vaux of the auxiliary winding $T1_{aux}$ is a DC value as shown in equation (1):

$$V_{aux} = \frac{V_{out}}{N_{aux}} \tag{1}$$

$N_{aux}$ is the turns ratio between the secondary winding $T1\_s$ and the auxiliary winding $T1_{aux}$ for the flyback transformer.

This auxiliary voltage Vaux will charge the capacitor C2 through a branch including resistance R2 during the off-time Toff. The final voltage Vc2 across the capacitor C2 at the end of Toff is defined in equation (2):

$$V_{C2} = \frac{V_{out}}{N_{aux}} \cdot \left(1 - e^{\frac{T_{off}}{R_2 \times C_2}}\right) \tag{2}$$

If R2*C2>>Toff, equation (2) can be simplified as (3)

$$V_{C2\_p} = \frac{V_{out}}{N_{aux}} \cdot \frac{T_{off}}{R_2 \times C_2} \tag{3}$$

Additional circuit components resistor R1 and capacitor C3 as coupled in series across the capacitor C2 will average the voltage across capacitor C2 and form a DC voltage signal. The average voltage across the capacitor C3 is the recreated output current signal $V_{cs}$ (i.e., a signal representative of the output current), given in equation (4):

$$V_{CS\_AVG} = \frac{1}{2} \cdot \frac{\frac{V_{out}}{N_{aux}} \cdot \frac{T_{off}}{R_2 \times C_2} \cdot T_{off}}{T_{on} + T_{off}} \tag{4}$$

Wherein the recreated output current signal $V_{cs}$ is proportional to the output current $I_{out}$, one of skill in the art may appreciate that this signal $V_{cs\_avg}$ may be used as a feedback signal to the input terminal Ctr of the controller 22 to facilitate output current regulation. The controller is configured to regulate the output current through the load based on the feedback signal from the feedback circuit.

In a particular embodiment, the controller 22 is configured to regulate the output current through the load by generating driving signals at terminal GD to turn the switching element on and off based on a comparison of the feedback signal provided at feedback input terminal Ctr from the feedback circuit 24 to a reference value Vref corresponding to a desired output current through the load. The reference value may be defined with respect to, for example, a dimming control signal Vdim, wherein a dimming capability is implemented by the controller.

The following section is provided to demonstrate that the recreated output current signal $V_{cs\_avg}$ is truly proportional to the output current $I_{out}$.

Current and voltage information for the primary winding $T1_p$ is shown in FIG. 4. Equations (5)(6) and (7) can be derived from magnetic voltage and current balance relationships:

$$L \cdot I_{T1\_P} = V_{in} \cdot T_{on} \qquad (5)$$

$$L \cdot I_{T1\_P} = N \cdot V_{out} \cdot T_{off} \qquad (6)$$

$$I_{out\_AVG} = \frac{1}{2} \cdot \frac{N \cdot I_{T1\_P} \cdot T_{off}}{T_{on} + T_{off}} \qquad (7)$$

N is the turns ratio between the primary winding and the secondary winding $T1_p/T1_s$. $V_{in}$ is the instant input voltage for the diode bridge rectifier.

The relationship between $V_{cs\_avg}$ and $I_{out\_avg}$, is defined in equation (8):

$$\frac{V_{CS\_AVG}}{I_{out\_AVG}} = \frac{\frac{1}{2} \cdot \frac{\frac{V_{out}}{N_{aux}} \cdot \frac{T_{off}}{R_2 \times C_2} \cdot T_{off}}{T_{on} + T_{off}}}{\frac{1}{2} \cdot \frac{N \cdot I_{T1\_P} \cdot T_{off}}{T_{on} + T_{off}}} = \frac{V_{out} \cdot T_{off}}{R_2 \cdot C_2 \cdot N_{aux} \cdot N \cdot I_{T1\_P}} \qquad (8)$$

From equation (6), $I_{T1\_p}$ information may be obtained as follows:

$$I_{T1\_P} = 1/L \cdot N \cdot V_{out} \cdot T_{off} \qquad (9)$$

Substituting equation (9) into equation (8), the final relationship between recreated current signal $V_{cs\_avg}$ and real output current signal $I_{out\_avg}$:

$$\frac{V_{CS\_AVG}}{I_{out\_AVG}} = \frac{V_{out} \cdot T_{off}}{R_2 \cdot C_2 \cdot N_{aux} \cdot N \cdot \frac{1}{L} \cdot N \cdot V_{out} \cdot T_{off}} = \frac{L}{R_2 \cdot C_2 \cdot N_{aux} \cdot N^2}$$

As shown in equation (10), the recreated current signal $V_{cs\_avg}$ is proportional with respect to the real output current signal $I_{out\_avg}$ and has nothing to do with either the output voltage or the input voltage. This means, essentially, that the recreated current signal, generated as disclosed herein through the use of an auxiliary winding voltage, can be used by the power factor correction controller to regulate the output current. As shown in FIG. 2, the voltage across capacitor C3, which is the recreated output current average signal $V_{cs\_avg}$, is fed to feedback input terminal Ctr to facilitate output current regulation.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A flyback power converter comprising:
   a flyback transformer having magnetically coupled first, second and third windings;
   a primary circuit comprising a switching element coupled in series with the first winding and a controller configured to drive the switching element wherein a current is provided through the first winding;
   a secondary circuit galvanically isolated from the primary circuit and comprising a load coupled across the second winding; and
   a feedback circuit coupled across the third winding and galvanically isolated from the secondary circuit, the feedback circuit configured to generate a feedback signal to the controller representative of an output current through the load;
   wherein the controller is further configured to
      regulate the output current through the load based on the feedback signal from the feedback circuit, and
      regulate the output current through the load by generating driving signals to turn the switching element on and off based on a comparison of the feedback signal from the feedback circuit to a reference value corresponding to a desired output current through the load;
   wherein the feedback signal comprises a feedback voltage that is proportional to the output current through the load; and
   wherein the feedback circuit comprises
      an energy storage device coupled in parallel with the third winding,
      a first branch coupled between the energy storage device and the third winding, and
      a second branch coupled in parallel with the first branch between the energy storage device and the third winding,
      wherein the energy storage device is charged through the first branch during an on-time of the switching element in the primary circuit, and
      the energy storage device discharges through the second branch during an off-time of the switching element in the primary circuit.

2. The power converter of claim 1, wherein the controller is configured to receive a dimming control signal defining the reference value corresponding to the desired output current through the load.

3. The power converter of claim 1, the feedback circuit further comprising a clamping circuit coupled to the energy storage device and configured to clamp a voltage across the energy storage device to zero during the on-time of the switching element in the primary circuit.

4. The power converter of claim 3, the energy storage device comprising a first energy storage device, wherein the feedback circuit further comprises a second energy storage device and a resistance coupled in series across the first energy storage device, and the feedback signal to the controller representative of the output current through the load is an average voltage across the second energy storage device.

5. The power converter of claim 1, wherein the load comprises one or more light-emitting diodes (LEDs) coupled in series.

6. The power converter of claim 1, wherein the primary circuit and the feedback circuit are coupled to a common ground.

7. The power converter of claim 1, wherein the primary circuit is configured to receive input power from a DC source.

8. The power converter of claim 7, the DC source comprising a diode bridge rectifier configured to convert an AC input from an external source into DC power for the primary circuit.

9. A method of regulating an output current through an LED array, the method comprising:
- receiving input power from a DC source;
- generating an output current through a load based on the input power and galvanically isolated with respect to the DC source;
- generating a feedback signal representative of the load current and galvanically isolated with respect to the load; and
- regulating the output current through the load based on the feedback signal;
- wherein generating an output current through a load based on the input power comprises turning on and off a switching element to generate a primary current through a first winding of an isolation transformer, wherein the load is coupled to a second winding of the isolation transformer; and
- wherein generating a feedback signal representative of the load current comprises
  - charging an energy storage device across a third winding of the isolation transformer during off-times of the switching element,
  - discharging the energy storage device during on-times of the switching element, and
  - averaging a voltage across the energy storage device to define a feedback signal proportional to the output current.

10. The method of claim 9, wherein the feedback signal comprises a feedback voltage that is proportional to the output current through the load.

11. The method of claim 9, wherein the load comprises one or more LEDs coupled in series.

12. The method of claim 9, wherein regulating the output current through the load based on the feedback signal comprises driving the switching element on and off to regulate the primary current through the first winding based on a comparison of the feedback signal and a reference value corresponding to a desired output current.

13. The method of claim 12, further comprising receiving a dimming control signal defining the reference value corresponding to the desired output current.

* * * * *